(12) United States Patent
Rushton

(10) Patent No.: US 11,273,516 B2
(45) Date of Patent: Mar. 15, 2022

(54) ULTRASONIC SLOTTED CYLINDRICAL BLOCK HORN

(71) Applicant: Sonics & Materials, Inc., Newtown, CT (US)

(72) Inventor: Andrew Rushton, New Milford, CT (US)

(73) Assignee: Sonics & Materials, Inc., Newtown, CT (US)

( * ) Notice: Subject to any disclaimer, the term of this patent is extended or adjusted under 35 U.S.C. 154(b) by 96 days.

(21) Appl. No.: 15/929,423

(22) Filed: May 1, 2020

(65) Prior Publication Data

US 2021/0339336 A1 Nov. 4, 2021

(51) Int. Cl.
*B23K 20/10* (2006.01)
*B29C 65/08* (2006.01)

(52) U.S. Cl.
CPC ............ *B23K 20/106* (2013.01); *B29C 65/08* (2013.01)

(58) Field of Classification Search
CPC .............. B23K 20/10–106; B23K 1/06; B29C 65/08–088
USPC ....................... 228/110.1, 1.1; 156/73.1–73.4
See application file for complete search history.

(56) References Cited

U.S. PATENT DOCUMENTS

| | | | | |
|---|---|---|---|---|
| 3,529,660 A | * | 9/1970 | Obeda | B23K 20/106 165/47 |
| 3,586,122 A | * | 6/1971 | Jacke | B29C 66/24221 181/205 |
| 3,628,071 A | * | 12/1971 | Harris | B06B 3/02 74/15.4 |
| 3,873,859 A | * | 3/1975 | Shoh | B29C 66/81429 310/325 |
| 4,063,990 A | * | 12/1977 | Volz | B29C 65/08 156/580.2 |
| 4,540,113 A | * | 9/1985 | Shimazaki | B06B 3/00 228/1.1 |
| 5,095,188 A | * | 3/1992 | Klein | B06B 3/00 219/121.14 |
| 5,096,532 A | * | 3/1992 | Neuwirth | B06B 3/00 156/580.1 |
| 5,110,403 A | * | 5/1992 | Ehlert | B06B 3/00 156/580.1 |
| 5,238,170 A | * | 8/1993 | Nuss | B23K 20/10 156/580.2 |

(Continued)

FOREIGN PATENT DOCUMENTS

| | | | | |
|---|---|---|---|---|
| DE | 102011005536 A1 | * | 9/2012 | ......... B29C 66/8145 |
| JP | 63139727 A | * | 6/1988 | ............ B29C 65/08 |
| JP | 05212796 A | * | 8/1993 | ........... B29C 66/545 |

*Primary Examiner* — Kiley S Stoner
(74) *Attorney, Agent, or Firm* — Forge IP, PLLC

(57) ABSTRACT

An ultrasonic block horn includes a generally cylindrical block of material having a first generally circular planar end surface, a second generally circular planar end surface and a generally circular circumferential side surface extending between the first and second generally planar end surfaces. A first plurality of through holes are formed in the generally cylindrical block of material, each of the first plurality of through holes extending from a first opening in the circumferential side surface to a second opening in the circumferential side surface, and each of the first plurality of through holes being generally parallel with, and spaced apart from, each other of the first plurality of through holes.

19 Claims, 4 Drawing Sheets

(56) References Cited

U.S. PATENT DOCUMENTS

| | | | | |
|---|---|---|---|---|
| 5,421,923 | A * | 6/1995 | Clarke | B06B 3/00 |
| | | | | 156/292 |
| 6,396,195 | B1 * | 5/2002 | Lindblad | B29C 66/81415 |
| | | | | 310/323.19 |
| 6,521,067 | B1 * | 2/2003 | Clark | B05B 17/0623 |
| | | | | 156/290 |
| 2004/0211812 | A1 * | 10/2004 | Hizukuri | B23K 20/10 |
| | | | | 228/1.1 |
| 2006/0196915 | A1 * | 9/2006 | Gunnerman | B01J 19/10 |
| | | | | 228/110.1 |
| 2008/0131758 | A1 * | 6/2008 | Makovetski | H01M 50/3425 |
| | | | | 429/56 |
| 2014/0083622 | A1 * | 3/2014 | Noder | B29C 65/08 |
| | | | | 156/580.1 |
| 2015/0352662 | A1 * | 12/2015 | Sheehan | B23K 20/106 |
| | | | | 228/1.1 |
| 2016/0158877 | A1 * | 6/2016 | Ballough | B29C 66/54 |
| | | | | 228/1.1 |
| 2020/0164459 | A1 * | 5/2020 | Keller | B29C 65/082 |
| 2021/0114309 | A1 * | 4/2021 | Beach | B29C 66/532 |

* cited by examiner

ULTRASONIC SLOTTED CYLINDRICAL BLOCK HORN

FIELD OF THE INVENTION

The present invention relates generally to a horn (also known as a probe) for use in connection with an ultrasonic system, and more specifically, to an ultrasonic slotted cylindrical block horn that may be used in connection with ultrasonic welding, liquid processing, sample preparation or the like.

BACKGROUND OF THE INVENTION

Since its inception over a half century ago, the use of ultrasonics has increased substantially. Originally employed for ultrasonically welding thermoplastic workpieces together, ultrasonics is now also employed for a variety of other purposes, including metal welding, liquid processing, sample preparation, etc.

As the uses for ultrasonics have expanded, so too have the design options for the ultrasonic probes or horns that are used as part of the process, with one particular type of probe/horn in wide use today being the slotted block horn. This type of ultrasonic horn is made of a block of metal, such as steel, aluminum or titanium, with slots machined in it between the top and bottom surfaces. Typical slotted ultrasonic block horns resonate at ultrasonic frequencies typically used in ultrasonic welders (e.g., 15 kHz-60 kHz).

While slotted block horns come in various shapes and sizes, including those that are square, rectangular, elongated "knife shaped," etc., the present invention is particularly concerned with those that are generally cylindrical in shape. Such slotted cylindrical block horns have been known for some time, with one particular example of a prior art slotted cylindrical block horn being shown in FIGS. 1A and 1B.

In this illustrated prior art design, the exemplary slotted cylindrical block horn (10) has a generally cylindrical body (12), with a longitudinal axis (A), the body (12) being formed from a metal, such as steel, aluminum or titanium, with a plurality of slots (14) machined therein it between a top surface (16) and a bottom surface (18). A longitudinal hole (20) may be provided in the top surface (16) and/or the bottom surface (18), as desired depending on the intended use of the horn (10), as is known.

Also as is known, the slots (14) may be generally elongated from top to bottom, although such is not required. Each of the slots (14) is radially formed in a spoke-like configuration as viewed from above (see, e.g., FIG. 1B), and each is generally uniform in size and shape. Moreover, the slots (14) are generally equally angularly spaced around the longitudinal axis (A) of the cylindrical body (12) in order to define a plurality of pie-shaped "slices" (22) of solid metal therebetween, as best seen in FIG. 1B.

Although other specific examples of slotted cylindrical block horns are also known, conventional wisdom has dictated this general configuration of equally-spaced, radial "spoke-like) slots (14), because it has been thought to be necessary for the "slices" (22) to be of generally uniform size and shape in order to ensure that the horn (10) vibrates with a uniform amplitude across its entire upper face (16).

As will be recognized, this consideration (i.e., uniform amplitude of vibration across the face of the horn) is important in many applications. For example, when the horn is used for ultrasonic welding, if the amplitude across the face is not uniform, there exists the risk of creating localized "hot" spots and "cold" spots, leading to possible over-welding and under-welding, respectively. Similarly, where the horn is used as part of a sample preparation system, e.g., where the horn is used to process samples in a plate containing a grid of sample wells, localized "hot" spots and "cold" spots can lead to some samples being damaged by over-preparation and other samples not being fully prepared.

Thus, while conventional wisdom has traditionally been that a uniform amplitude across the entire upper face of a slotted cylindrical horn is to be achieved by the provision of equally-spaced, radial slots, the applicant had discovered that such is not necessarily true, and that at least in some circumstances, the provision of equally-spaced, radial slots in connection with a slotted cylindrical horn is not, in fact, optimal.

The present invention, therefore, aims to provide an ultrasonic slotted cylindrical horn having a generally uniform amplitude across a face thereof.

SUMMARY OF THE INVENTION

In accordance with one aspect of the present invention, an ultrasonic block horn includes a generally cylindrical block of material having a first generally circular planar end surface, a second generally circular planar end surface and a generally circular circumferential side surface extending between the first and second generally planar end surfaces. A first plurality of through holes are formed in the generally cylindrical block of material, each of the first plurality of through holes extending from a first opening in the circumferential side surface to a second opening in the circumferential side surface, and each of the first plurality of through holes being generally parallel with, and spaced apart from, each other of the first plurality of through holes.

In some embodiments, a second plurality of through holes are formed in the generally cylindrical block of material, each of the second plurality of through holes extending from a first opening in the circumferential side surface to a second opening in the circumferential side surface, and each of the second plurality of through holes being generally parallel with, and spaced apart from, each other of the second plurality of through holes. In certain of these embodiments, the first plurality of through holes are generally orthogonal with the second plurality of through holes.

In some embodiments, the first generally planar end surface is generally parallel with the second generally planar end surface. In certain of these embodiments, the first plurality of through holes are generally parallel with the first generally planar end surface and the second generally planar end surface. In certain embodiments, the circumferential side surface is generally orthogonal to the first and second generally planar end surfaces.

In some embodiments, each of the first plurality of through holes is formed as an elongated slot having a height extending between a first end adjacent to the first planar end surface and a second end adjacent to the second planar end surface and a width, wherein the height is greater than the width. In certain of these embodiments, the first and second ends of each slot are rounded.

In some embodiments, the generally cylindrical block of material is formed from metal. In certain of these embodiments, the generally cylindrical block of material is formed from aluminum.

In some embodiments, a raised ring of material extends outwardly from the first generally circular planar end surface. In some embodiments, the first generally circular planar end surface has a blind hole formed therein at a center thereof. In some embodiments, the generally circular circumferential side surface has an annular recess formed therein, the annular recess being adapted to receive an o-ring seal.

In accordance with another aspect of the present invention, an ultrasonic block horn includes a generally cylindrical block of material having a first generally circular planar end surface, a second generally circular planar end surface and a generally circular circumferential side surface extending between the first and second generally planar end surfaces, the first generally planar end surface being generally parallel with the second generally planar end surface, and the circumferential side surface being generally orthogonal to the first and second generally planar end surfaces. A first plurality of through holes are formed in the generally cylindrical block of material, each of the first plurality of through holes extending from a first opening in the circumferential side surface to a second opening in the circumferential side surface, and each of the first plurality of through holes being generally parallel with, and spaced apart from, each other of the first plurality of through holes. A second plurality of through holes are also formed in the generally cylindrical block of material, each of the second plurality of through holes extending from a first opening in the circumferential side surface to a second opening in the circumferential side surface, and each of the second plurality of through holes being generally parallel with, and spaced apart from, each other of the second plurality of through holes. The first plurality of through holes are generally orthogonal with the second plurality of through holes, and the first plurality of through holes and the second plurality of through holes are generally parallel with the first generally planar end surface and the second generally planar end surface.

In some embodiments, each of the first plurality of through holes and each of the second plurality of through holes is formed as an elongated slot having a height extending between a first end adjacent to the first planar end surface and a second end adjacent to the second planar end surface and a width, wherein the height is greater than the width. In certain of these embodiments, the first and second ends of each slot are rounded.

In some embodiments, the generally cylindrical block of material is formed from metal. In certain of these embodiments, the generally cylindrical block of material is formed from aluminum.

In some embodiments, a raised ring of material extends outwardly from the first generally circular planar end surface. In some embodiments, the first generally circular planar end surface has a blind hole formed therein at a center thereof. In some embodiments, the generally circular circumferential side surface has an annular recess formed therein, the annular recess being adapted to receive an o-ring seal.

Other features and advantages of the invention will become more apparent from consideration of the following drawing.

DETAILED DESCRIPTION OF THE INVENTION

Figure 1A:
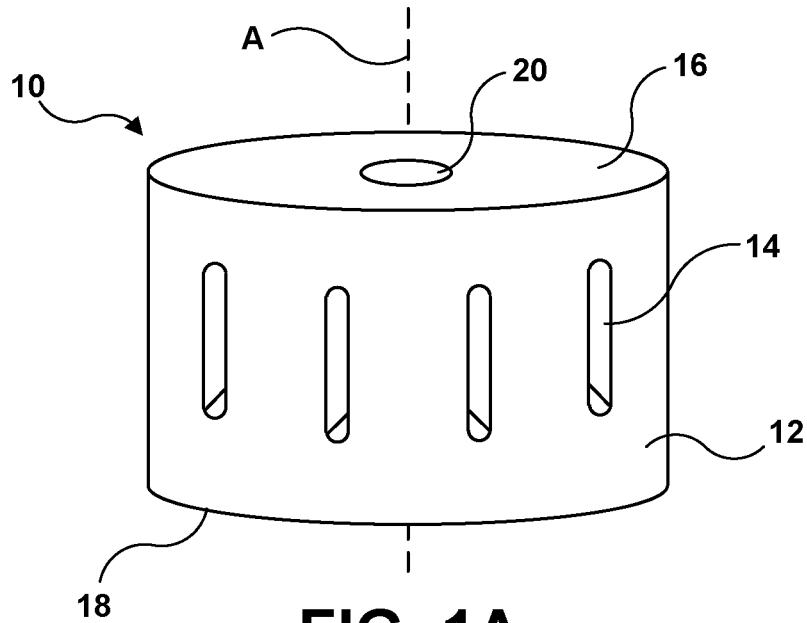
FIG. 1A is an isometric view depicting an exemplary prior art slotted cylindrical block horn having a plurality of equally-spaced, radial slots formed therein.
Figure 1B:
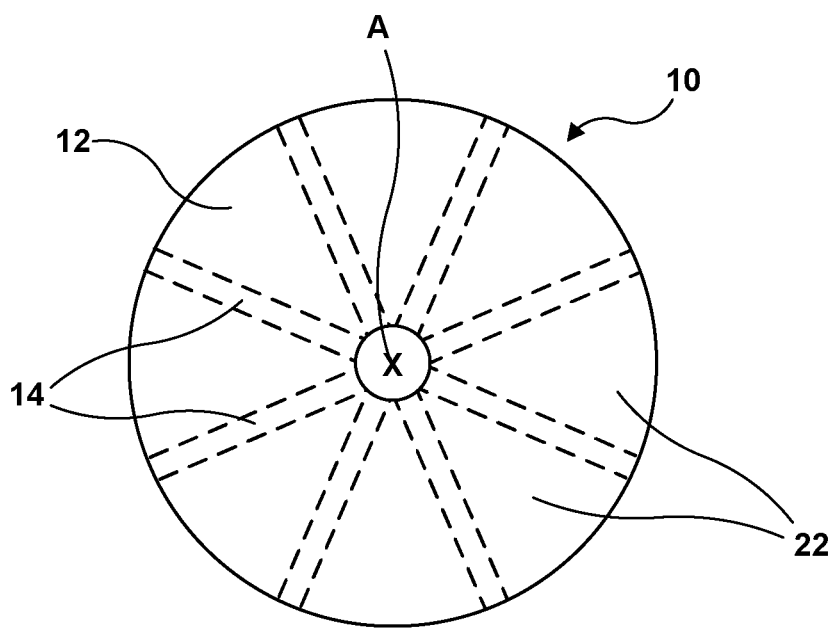
FIG. 1B is a top plan view of the prior art slotted cylindrical block horn of FIG. 1A.
Figure 2:
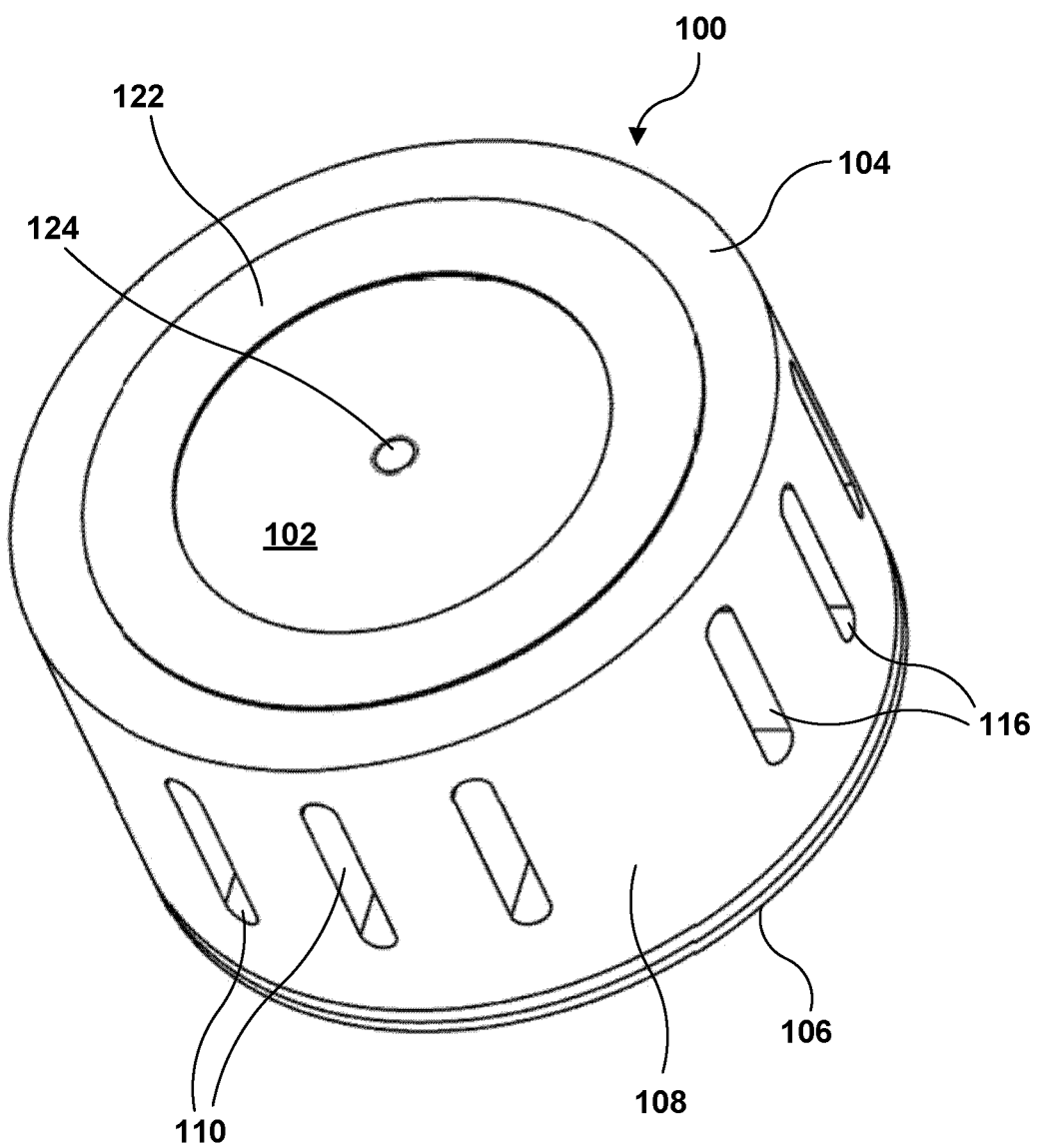
FIG. 2 is an isometric view depicting a slotted cylindrical block horn configured in accordance with an exemplary embodiment of the present invention.
Figure 3:
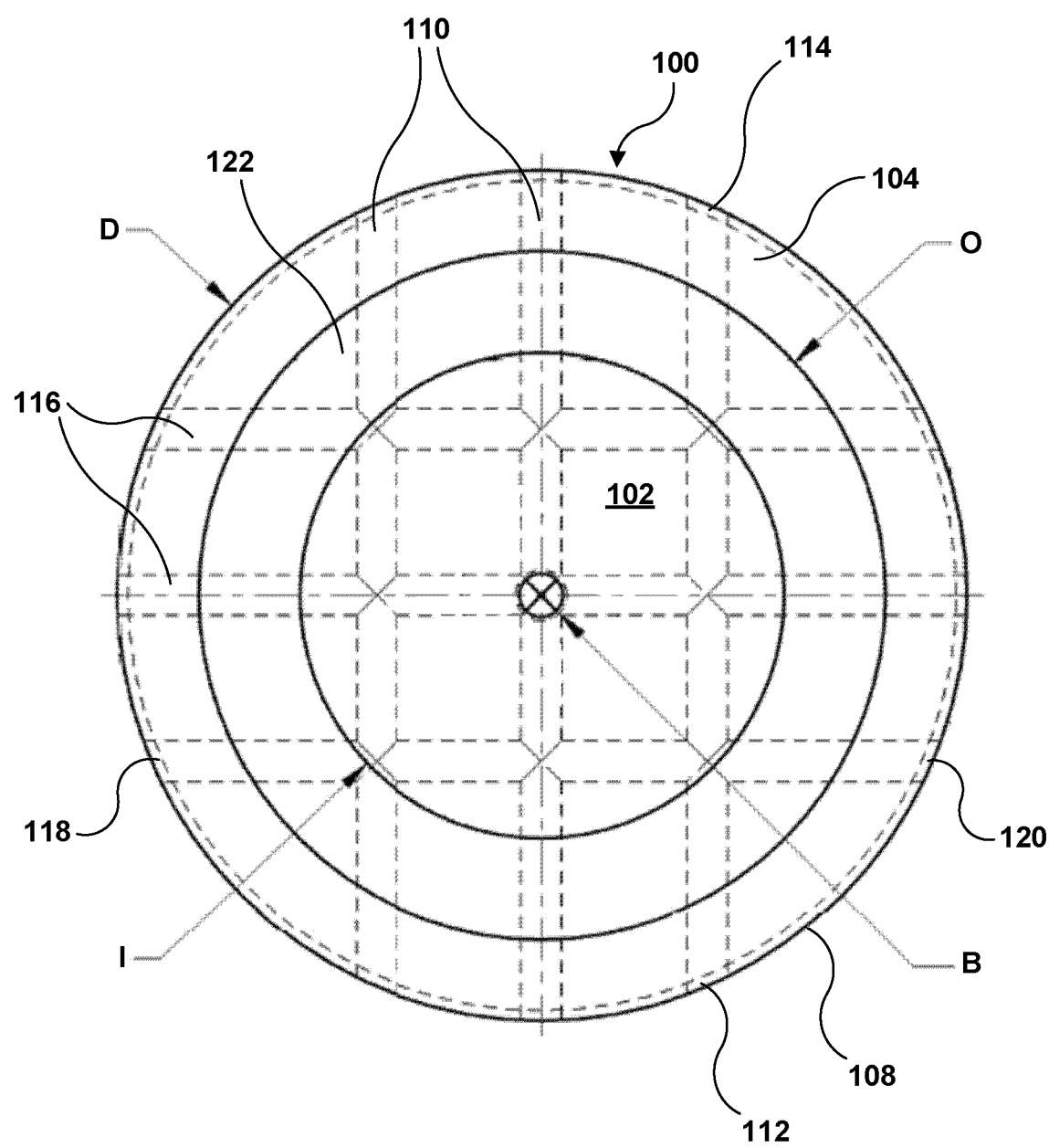
FIG. 3 is a top plan view of the slotted cylindrical block horn of FIG. 2.
Figure 4:
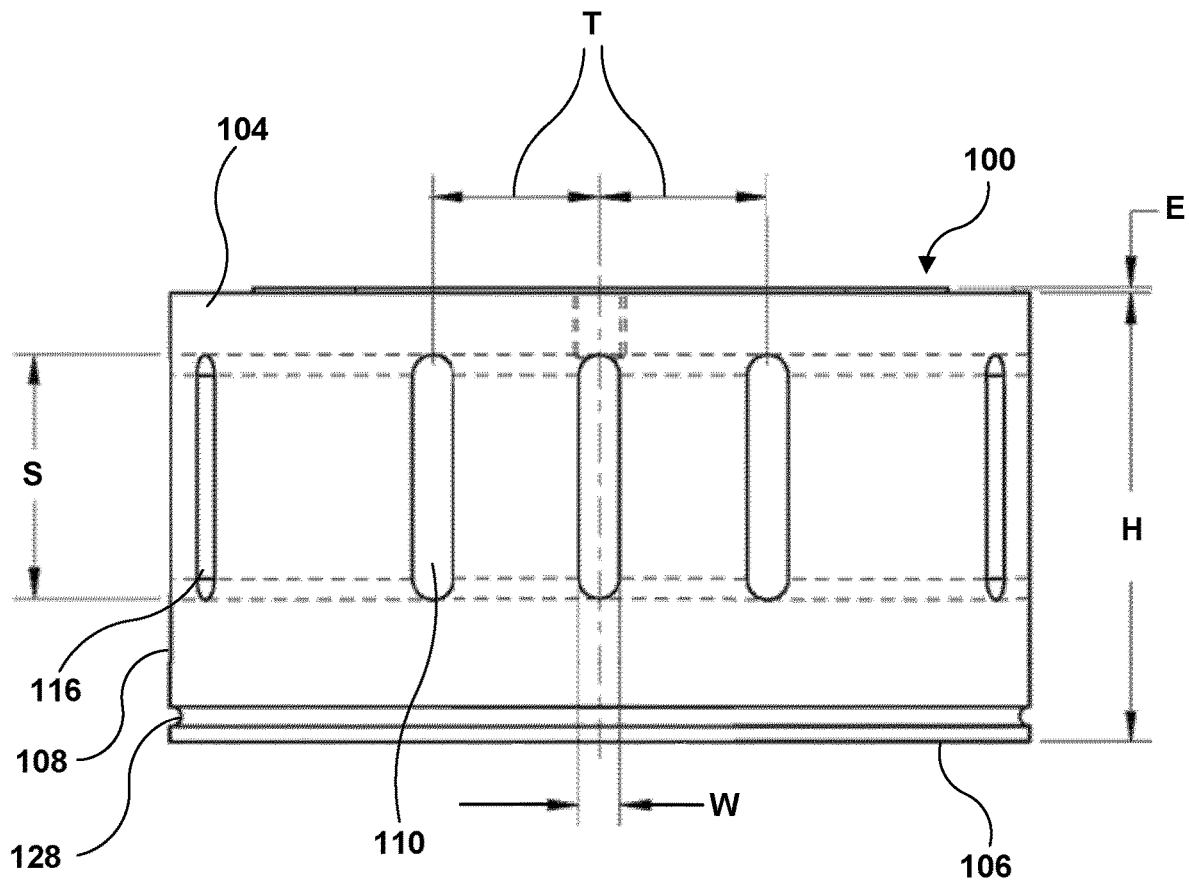
FIG. 4 is a partial side view of the slotted cylindrical block horn of FIG. 2.

Referring now to FIGS. 2-4 of the drawings, an ultrasonic block horn (100) in accordance with one exemplary embodiment of the invention is shown. The ultrasonic block horn (100) includes a generally cylindrical block of material (102) having a first generally circular planar end surface (104), a second generally circular planar end surface (106) and a generally circular circumferential side surface (108) extending between the first and second generally planar end surfaces (104, 106).

In the embodiment shown, the generally cylindrical block of material (102) has a diameter (D) of about 5.25 inches (133.35 mm) and a height (H) of about 2.75 inches (69.85 mm). The particular ultrasonic block horn (100) shown is intended for use in connection with an ultrasonic system having a frequency of about 40 kHz, although those skilled in the art will understand that these various parameters can be configured as appropriate for the intended use of the horn (100).

A first plurality of through holes (110) are formed in the generally cylindrical block of material (102), each of the first plurality of through holes (110) extending from a first opening (112) in the circumferential side surface (108) to a second opening (114) in the circumferential side surface (108). In the particular embodiment shown, the first plurality of through holes (110) comprises three through holes (i.e., those being the through holes that are vertically disposed with respect to the orientation shown in FIG. 3). As best seen in FIG. 3, each of the first plurality of through holes (110) is generally parallel with, and spaced apart from, each other of the first plurality of through holes (110).

A second plurality of through holes (116) are also formed in the generally cylindrical block of material (102), each of the second plurality of through holes (116) extending from a first opening (118) in the circumferential side surface (108) to a second opening (120) in the circumferential side surface (108). In the particular embodiment shown, the second plurality of through holes (116) comprises three through holes (i.e., those being the through holes that are horizontally disposed with respect to the orientation shown in FIG. 3). As best seen in FIG. 3, each of the second plurality of through holes (116) is generally parallel with, and spaced apart from, each other of the second plurality of through holes (116).

Again, as best seen in FIG. 3, the first plurality of through holes (110) are generally orthogonal with the second plurality of through holes (116).

As best seen in FIG. 4, the first generally planar end surface (104) is generally parallel with the second generally planar end surface (106), and the circumferential side surface (108) is generally orthogonal to both the first and second generally planar end surfaces (104, 106). Also as best seen in FIG. 4, the first plurality of through holes (110) and the second plurality of through holes (116) are generally parallel with the first generally planar end surface (104) and the second generally planar end surface (106).

As shown in FIGS. 2 and 4, each of the first plurality of through holes (110) and the second plurality of through holes (116) is formed as an elongated slot having a height (S) extending between a first rounded end adjacent to the first planar end surface (104) and a second rounded end adjacent to the second planar end surface (106) and a width (W). The height (S) of each slot is greater than the width (W), with the exemplary embodiment illustrating a height (S) of about 1.5 inches (38.1 mm) and a width (W) of about 0.25 inches (6.35 mm). In the exemplary embodiment shown, each of the first plurality of through holes (110) and each of the second plurality of through holes (116) are generally spaced apart from each other by a spacing distance (T) of about 1.025 inches (26.035 mm).

It has been found to be beneficial in some embodiments to provide a raised ring of material (122) extending outwardly from the first generally circular planar end surface (104). Specifically, it has been found that such a raised ring of material (122) may help ensure a uniform amplitude across the entire end surface (104), particularly when the horn (100) is used for ultrasonic liquid processing and/or sample preparation. However, as will be recognized by those skilled in the art, when the horn (100) is used for ultrasonic welding, such that the end surface (104) directly contacts a workpiece to be welded, it may be desirable for the raised ring of material (122) to be omitted.

In the illustrated embodiment, the raised ring of material (122) has an outer diameter (O) of about 4.25 inches (107.95 mm), an inner diameter (I) of about 3.0 inches (76.2 mm) and a height (E) of about 0.030 inches (0.762 mm). Of course, one skilled in the art will realize that these dimensions of the ring of material (122) are exemplary only, and that they can be varied as the other relative dimensions of the horn (100) are varied.

The first generally circular planar end surface (104) may also optionally be provided with a blind hole (124) formed therein at a center thereof for tuning and/or mounting purposes, if desired. In the exemplary embodiment shown, the blind hole (124) has a diameter (B) of about 0.315 inches (8 mm) and a depth of about 0.390 inches (9.906 mm). More specifically, if desired to be used for mounting purposes, the blind hole (124) may be tapped with a threaded tap, such as an M8×1.25 tap.

Further, in the illustrated embodiment, the generally circular circumferential side surface (108) has an annular recess (128) formed therein, the annular recess (128) being sized and shaped to receive an o-ring seal. As known in the art, such an o-ring seal is particularly useful when the horn (100) is used as part of a liquid processing and/or sample preparation system, where the horn is fit into a processing cell, which often is made from a thermoplastic material.

As is known, the generally cylindrical block of material (102) is formed from metal, such as steel, aluminum, titanium, etc., with the particular illustrated embodiment being formed from aluminum. As is well known, the material chosen is based on various considerations, primarily relating to the intended use of the horn.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An ultrasonic block horn comprising:
    a generally cylindrical block of material having a first generally circular planar end surface, a second generally circular planar end surface and a generally circular circumferential side surface extending between the first and second generally planar end surfaces;
    a first plurality of through holes formed in said generally cylindrical block of material, each of said first plurality of through holes extending from a first opening in the circumferential side surface to a second opening in the circumferential side surface, and each of said first plurality of through holes being generally parallel with, and spaced apart from, each other of said first plurality of through holes; and
    a second plurality of through holes formed in said generally cylindrical block of material, each of said second plurality of through holes extending from a first opening in the circumferential side surface to a second opening in the circumferential side surface, and each of said second plurality of through holes being generally parallel with, and spaced apart from, each other of said second plurality of through holes;
    wherein said first plurality of through holes are generally orthogonal with said second plurality of through holes.

2. The ultrasonic block horn of claim 1 wherein the first generally planar end surface is generally parallel with the second generally planar end surface.

3. The ultrasonic block horn of claim 2 wherein said first plurality of through holes are generally parallel with the first generally planar end surface and the second generally planar end surface.

4. The ultrasonic block horn of claim 2 wherein the circumferential side surface is generally orthogonal to the first and second generally planar end surfaces.

5. The ultrasonic block horn of claim 1 wherein each of said first plurality of through holes is formed as an elongated slot having a height extending between a first end adjacent to the first planar end surface and a second end adjacent to the second planar end surface and a width, wherein the height is greater than the width.

6. The ultrasonic block horn of claim 5 wherein the first and second ends of each slot are rounded.

7. The ultrasonic block horn of claim 1 wherein the generally cylindrical block of material is formed from metal.

8. The ultrasonic block horn of claim 7 wherein the generally cylindrical block of material is formed from aluminum.

9. The ultrasonic block horn of claim 1 further comprising a raised ring of material extending outwardly from the first generally circular planar end surface.

10. The ultrasonic block horn of claim 1 wherein the first generally circular planar end surface has a blind hole formed therein at a center thereof.

11. The ultrasonic block horn of claim 1 wherein the generally circular circumferential side surface has an annular recess formed therein, said annular recess being adapted to receive an o-ring seal.

12. An ultrasonic block horn comprising:
    a generally cylindrical block of material having a first generally circular planar end surface, a second generally circular planar end surface and a generally circular circumferential side surface extending between the first and second generally planar end surfaces, the first generally planar end surface being generally parallel with the second generally planar end surface, and the circumferential side surface being generally orthogonal to the first and second generally planar end surfaces;
    a first plurality of through holes formed in said generally cylindrical block of material, each of said first plurality of through holes extending from a first opening in the circumferential side surface to a second opening in the circumferential side surface, and each of said first plurality of through holes being generally parallel with, and spaced apart from, each other of said first plurality of through holes;

a second plurality of through holes formed in said generally cylindrical block of material, each of said second plurality of through holes extending from a first opening in the circumferential side surface to a second opening in the circumferential side surface, and each of said second plurality of through holes being generally parallel with, and spaced apart from, each other of said second plurality of through holes;

wherein said first plurality of through holes are generally orthogonal with said second plurality of through holes; and wherein said first plurality of through holes and said second plurality of through holes are generally parallel with the first generally planar end surface and the second generally planar end surface.

13. The ultrasonic block horn of claim 12 wherein each of said first plurality of through holes and each of said second plurality of through holes is formed as an elongated slot having a height extending between a first end adjacent to the first planar end surface and a second end adjacent to the second planar end surface and a width, wherein the height is greater than the width.

14. The ultrasonic block horn of claim 13 wherein the first and second ends of each slot are rounded.

15. The ultrasonic block horn of claim 12 wherein the generally cylindrical block of material is formed from metal.

16. The ultrasonic block horn of claim 15 wherein the generally cylindrical block of material is formed from aluminum.

17. The ultrasonic block horn of claim 12 further comprising a raised ring of material extending outwardly from the first generally circular planar end surface.

18. The ultrasonic block horn of claim 17 wherein the first generally circular planar end surface has a blind hole formed therein at a center thereof.

19. The ultrasonic block horn of claim 12 wherein the generally circular circumferential side surface has an annular recess formed therein, said annular recess being adapted to receive an o-ring seal.

* * * * *